(12) United States Patent
Aso

(10) Patent No.: US 12,715,245 B2
(45) Date of Patent: Aug. 25, 2026

(54) RIGID AXLE WITH A SPRING SEAT

(71) Applicant: Autotech Engineering S.L., Amorebieta-Etxano (ES)

(72) Inventor: Raymond Aso, Bowburn (GB)

(73) Assignee: Autotech Engineering S.L., Amorebieta-Etxano (ES)

( * ) Notice: Subject to any disclaimer, the term of this patent is extended or adjusted under 35 U.S.C. 154(b) by 328 days.

(21) Appl. No.: 18/378,392

(22) Filed: Oct. 10, 2023

(65) Prior Publication Data

US 2024/0116312 A1 Apr. 11, 2024

(30) Foreign Application Priority Data

Oct. 11, 2022 (EP) .................................... 22382967

(51) Int. Cl.
*B60B 35/00* (2006.01)
*B60B 35/04* (2006.01)
*B60G 9/00* (2006.01)
*B60G 11/00* (2006.01)

(52) U.S. Cl.
CPC ........... *B60B 35/007* (2013.01); *B60B 35/04* (2013.01); *B60G 9/00* (2013.01); *B60G 11/00* (2013.01); *B60G 2204/12* (2013.01)

(58) Field of Classification Search
CPC ...... B60B 35/007; B60B 35/004; B60B 35/04
See application file for complete search history.

(56) References Cited

U.S. PATENT DOCUMENTS 1,396,044 A 11/1921 Lowe
1,544,439 A * 6/1925 Fielder ................. B60B 35/163 301/132
3,804,467 A 4/1974 Austermann
4,630,804 A 12/1986 Fesko
4,684,110 A * 8/1987 Sale ...................... F16F 1/3683 267/52
4,801,129 A 1/1989 Wells
6,416,136 B1 * 7/2002 Smith .................. B60B 35/003 301/124.1
9,327,571 B2 * 5/2016 Pierce .................. B60B 35/007
10,005,321 B2 * 6/2018 Power ..................... F16D 51/24
2008/0001379 A1 * 1/2008 Myers .................. B60B 35/007 280/124.156

FOREIGN PATENT DOCUMENTS

DE 10036651 A1 2/2002
DE 202016008401 U1 10/2017
EP 0188133 A1 7/1986
EP 0278596 A1 8/1988

* cited by examiner

*Primary Examiner* — Jason R Bellinger
(74) *Attorney, Agent, or Firm* — The Webb Law Firm

(57) ABSTRACT

Provided is a spring seat body for connection to a rigid axle of a motor vehicle, including an upper and lower seat surfaces, lateral edge surfaces lying between the spring seat surface and the lower seat surface, and a pair of through holes for receiving and holding a clamping bracket for fastening a spring to the spring seat body. The lateral edge surfaces include a first and second edge surfaces which face away from one another and run transversely with respect to the rigid axle when the spring seat body is mounted on the rigid axle. Further when the spring seat body is mounted to the rigid axle the first edge surface may be closer to an end of the rigid axle carrying a vehicle wheel than the second edge surface, and the first edge surface may include an edge section which overlaps with the rigid axle.

15 Claims, 6 Drawing Sheets

3.3
17
14
13.4.1
13
20
3
13.5
7.1
7
9
3.2
7.2
4.2
6
5
4.1
6
4
10

13
13.3
13.6
18
18
18
19
18
13.1

13
13.24
18
13.4
22
13.2
13.24
19
13.23
18
13.21
13.24
18
22
13.2
13.22
13.24
18

13
T
13.41
T
13.1
13.31

13.2
13.4
22
13.22
18
18
19
13.23
13.21
18
18
13
13.3
22
13.2

RIGID AXLE WITH A SPRING SEAT

CROSS-REFERENCE TO RELATED APPLICATION

This application claims priority to European Patent Application No. 22382967.2 filed Oct. 11, 2022, the disclosure of which is hereby incorporated by reference in its entirety.

BACKGROUND OF THE INVENTION

Field of the Invention

The invention relates to a spring seat body for connection to a rigid axle of a motor vehicle, in particular a utility vehicle, having an upper spring seat surface, a lower seat surface, lateral edge surfaces which lie between the spring seat surface and the lower seat surface, and holding means for holding tensioning means for fastening at least one spring to the spring seat body, the lateral edge surfaces comprising a first edge surface and a second edge surface facing away from each other and extending transversely to the rigid axle when the spring seat body is mounted on the rigid axle, the first edge surface being closer to an end of the rigid axle carrying a vehicle wheel than the second edge surface when the spring seat body is mounted on the rigid axle, and the first edge surface having an edge section which overlaps the rigid axle when the spring seat body is mounted on the rigid axle. The spring seat body according to the invention may also be referred to as a leaf spring seat body.

Furthermore, the invention relates to a rigid axle for a motor vehicle, in particular an utility vehicle, with a spring seat body, preferably at least two spring seat bodies of the aforementioned type.

Description of Related Art

In the rear wheel suspensions of trucks or vans for transporting goods, the typical wheel suspension systems have a rear rigid axle or drive axle suspension in order to ensure maximum storage space in the cargo area of the motor vehicle in question. In this context, a rigid axle is understood to mean in particular a solid rear axle without drive. However, rigid axles of such wheel suspension systems are also designed as solid drive axles. The load compartment of the truck or van is supported by leaf springs on the rigid axle or solid drive axle. Such axles normally have an elongated main beam made of a steel profile or, in the case of a solid drive axle, an elongated cast steel housing. To connect the leaf springs to the axle, spring seat bodies are provided which are seated on the elongated main beam or cast steel housing and are normally connected to the latter by a welded or clamped joint. The weld seam is generally concave or straight when viewed from above in order to minimize the weight of the spring seat body or to ensure simple construction of the spring seat body.

Such spring seat bodies for rigid axles of motor vehicles are known in various designs (see, for example, DE 100 36 651 A1 and DE 20 2016 008 401 U1).

The spring seat bodies, their connection to the rigid axle and the elongated main beam or the elongated housing of the rigid axle designed as a drive axle are subjected to high loads, particularly when the loaded vehicle is in motion. To ensure satisfactory robustness, in particular fatigue strength, the spring seat bodies and the main beam or drive axle housing are designed with a relatively high material or wall thickness. As a result, however, conventional rigid axles of the type mentioned here have a correspondingly high overall weight, which has a detrimental effect on the fuel consumption of the vehicle concerned.

SUMMARY OF THE INVENTION

The invention is based on the object of improving a spring seat body of the type mentioned in the outset in such a way that it offers improved robustness, in particular increased fatigue strength, in its connection to a rigid axle of the type described above and thus enables a reduction in the overall weight of the rigid axle.

This object is solved by a spring seat body having the features as described herein. Advantageous embodiments of the spring seat body as described herein. Likewise, the above-mentioned object is solved by a rigid axle with the spring seat body as described herein. Advantageous embodiments of the rigid axle as described herein.

The spring seat body according to the invention is characterized in that a first of its lateral edge surfaces, which in the mounted state of the spring seat body on the rigid axle lies closer to an end of the rigid axle carrying a vehicle wheel than a second of its lateral edge surfaces, has an edge section which in the mounted state of the spring seat body on the rigid axle lies in overlap with the rigid axle, this edge section—viewed from above—being at least partially in the form of an outwardly projecting, preferably convex edge section, the apex or vertex of which lies in a region of the first edge surface which runs along a central length range of the upper spring seat surface extending transversely to the rigid axle, said central length range being less than one third, preferably less than one quarter, particularly preferably less than one fifth of the length of the upper spring seat surface.

In the present context, a convex edge section is understood to mean an edge section which has an outwardly curved contour. By contrast, a concave edge section is understood to mean an edge section which has an inwardly curved contour.

The outwardly projecting, preferably convex edge section of said lateral edge surface improves the durability of the connection between the spring seat body and the rigid axle, the connection preferably being designed as a welded connection, for example in the form of one or more weld seams. The outwardly projecting, preferably convex edge or weld seam section causes a small increase in the mass of the spring seat body, but offers a very mass-efficient improvement in the robustness of the spring seat body. This mass increase associated with the outwardly projecting, preferably convex, edge section of said lateral edge surface can be compensated by the large potential mass savings that can be realized in other parts of the rigid axle, such as an axial, preferably tubular, main beam of the rigid axle.

In comparative tests carried out by the inventor, it was found that the fatigue strength of a welded joint between a spring seat body according to the invention and a tubular steel main beam of a rigid axle, wherein the spring seat body has convex edge surfaces and is accordingly connected to the steel main beam by at least one convex weld seam, is considerably higher than the fatigue strength of a welded joint between a conventional spring seat body and a corresponding tubular steel main beam of an identical rigid axle, the conventional spring seat body having concave edge surfaces and accordingly being connected to the steel main beam by a concave weld seam. The improvement or increase in fatigue strength of the welded joint was, for example, about 78% with the convex weld. This improvement can be further increased by further accentuating the convex shape of the edge surface in question and thus of the weld seam, since the fatigue strength is primarily determined by the force from the load on the center of the wheel. By using a convex shape of the edge surface, the distance to the force application point is reduced and thus the bending stress at the weld seam in question is reduced.

An improvement in the fatigue strength of the weld seam by about 78% means a reduction in the stress in the heat-affected zone of the weld seam by about 10%. Based on the relationship $\sigma=F/A$, the wall thickness of the tubular main beam can thus be reduced by up to about 10%, resulting in a weight saving of about 10% or 1.63 kg in the above-mentioned comparative tests.

An advantageous embodiment of the spring seat body according to the invention provides that the second edge surface has an edge section which, in the mounted state of the spring seat body on the rigid axle, lies in overlap with the rigid axle, this edge section of the second edge surface, viewed from above, being formed at least partially as an outwardly projecting, preferably convex edge section, the apex or vertex of which lies in a region of the second edge surface which runs along a central length range of the upper spring seat surface extending transversely to the rigid axis, said central length range being less than one third, preferably less than one quarter, particularly preferably less than one fifth of the length of the upper spring seat surface. In other words, the second edge surface of the spring seat body has an edge section which corresponds to the edge section of the first edge surface according to the invention. Through this, the spring seat body according to the invention offers even further improved robustness, in particular increased fatigue strength in its connection with a generic rigid axle, thereby enabling a further reduction in the overall weight of the rigid axle.

A further advantageous embodiment of the spring seat body according to the invention is that it is designed as a forged part, preferably a forged steel part. Compared with metal casting, forging is a relatively fast machining process. Metal parts with complex shapes and contours can indeed be produced more easily by metal casting than by forging, which has certain limitations in this respect. However, the spring seat body according to the invention does not require a particularly complex shape and contour, so that it can advantageously be produced by forging. As a forged part, the spring seat body according to the invention has the advantage over a corresponding cast part of significantly higher strength and homogeneity of the material. The occurrence of porosity, shrinkage and cavities, which is often found in metal castings, is basically excluded in a forged part. The spring seat body according to the invention is therefore mechanically more robust than a correspondingly shaped spring seat body produced by metal casting. The spring seat body according to the invention can be made from comparatively inexpensive forge steel. In forging, in many cases no expensive steel alloy is required to obtain a high-strength component.

According to a further advantageous embodiment of the spring seat body according to the invention, the first edge surface and/or the second edge surface each have a fillet-shaped, preferably concave edge section along their sections which do not overlap with the rigid axle when viewed from above. This design limits the increase in weight of the spring seat body according to the invention compared with a conventional spring seat body which has exclusively a concave edge section along its section lying in overlap with the rigid axle, and also results in improved robustness, in particular increased fatigue strength, of the spring seat body in its connection with a generic rigid axle and thus enables the above-mentioned reduction in the overall weight of the rigid axle.

A further advantageous embodiment of the spring seat body according to the invention is characterized in that the outwardly projecting, preferably convex edge section does not project or projects only slightly, for example not more than 10 mm, beyond a tangent which touches the sections of the first or second edge surface not in overlap with the rigid axle. This embodiment is characterized by a very good improvement in the fatigue strength of the spring seat body in its connection with a generic rigid axle and allows a particularly extensive reduction in the overall weight of the rigid axle.

According to a further advantageous embodiment of the spring seat body according to the invention, at least one recess is formed in the seating surface thereof, which recess opens out at said edge section of the first edge surface, preferably opens out substantially centrally at said edge section of the first edge surface. The recess, which is formed for example in the form of a groove, preferably a groove with an arcuate cross-sectional profile, can reduce the introduction of heat, in particular into the spring seat body, and thus distortion or residual stresses of the spring seat body when the spring seat body is welded to the rigid axle. Alternatively or additionally, a recess is also formed in the seating surface, which opens at the edge section of the second edge surface, preferably opens substantially centrally at this edge section of the second edge surface, wherein this edge section lies in overlap with the rigid axle in the mounted state of the spring seat body on the rigid axle. This recess is also formed, for example, in the form of a groove, preferably a groove with an arcuate cross-sectional profile. It offers the same technical advantage as the at least one recess which opens at the said edge section of the first edge surface.

According to a further preferred embodiment of the spring seat body according to the invention, the spring seat surface and the holding means for holding tensioning means are formed for fastening at least one leaf spring.

A rigid axle for a motor vehicle, in particular an utility vehicle, according to the invention is provided with one, preferably with at least two, spring seat bodies according to the invention, which are designed according to one or more of the embodiments indicated above. Thereby, the advantages mentioned above with respect to the spring seat body according to the invention are obtained.

According to a preferred embodiment of the rigid axle according to the invention, the spring seat body is materially connected to the rigid axle. Particularly preferably, the spring seat body is connected to the rigid axle by weld seams and/or weld spots. Alternatively, however, the spring seat body can also be connected to the rigid axle by other material connections, for example one or more adhesive connections. In this way, a particularly robust connection between rigid axle and spring seat body can be achieved in a cost-effective manner.

A further advantageous embodiment of the invention is characterized in that the rigid axle has a flattened or substantially flat connecting surface at which the spring seat body is connected to the rigid axle. The flattened or substantially flat connecting surface of the rigid axle supports or effects a rotationally fixed connection of the spring seat body according to the invention to the rigid axle. The material connection between the spring seat body and the rigid axle is thus relieved or can be dimensioned accordingly smaller. In addition, the flattened or essentially flat connecting surface gives the rigid axle a cross-sectional profile, preferably a closed hollow profile, with which a relatively high flexural strength and torsional rigidity of the rigid axle can be achieved compared to other solid profiles or closed hollow profiles of the same transverse dimension and wall thickness.

According to a further embodiment of the invention, the rigid axle has, in its region at which the spring seat body is connected to the rigid axle, a cross-sectional profile which comprises at least two mutually parallel outer sides, preferably two pairs of mutually parallel outer sides. Particularly preferably, the rigid axle according to the invention thereby has a substantially rectangular or square hollow profile with rounded edges. With a corresponding profile, preferably a closed hollow profile, a relatively high flexural strength as well as torsional rigidity of the rigid axle can be achieved compared to a circular, closed hollow profile of the same transverse dimension and wall thickness.

A further advantageous embodiment of the invention provides that the spring seat body is welded to the rigid axle by forming one or more weld seams at least partially along the outwardly projecting, preferably convex edge section of the first edge surface and/or at least partially along the outwardly projecting, preferably convex edge section of the second edge surface. This makes it possible to achieve a very reliable substance-to-substance connection of the spring seat body to the rigid axle.

According to a further advantageous embodiment of the rigid axle according to the invention, the weld seams for connecting the spring seat body according to the invention to the rigid axle are arranged essentially symmetrically. This allows residual stresses in the spring seat body caused by heat input during welding to be reduced. Preferably, the weld seams for connecting the spring seat body according to the invention to the rigid axle are partially or completely in the form of fillet welds.

The rigid axle according to the invention is preferably designed as a non-driven rigid axle, whereby it is preferably formed from an axle tube or tubular profile. In this embodiment, the above advantages of the invention, in particular the potential percentage weight savings of the rigid axle, are significant. However, it is also within the scope of the invention for the rigid axle according to the invention to be designed as a drive axle, in which case it is formed in particular or essentially from an axle housing.

A further advantageous embodiment of the invention is characterized in that wheel carriers are attached to the ends of the rigid axle, each of which is supported on the rigid axle by means of a strut, preferably a substantially triangular hollow body strut, the strut being arranged on the same side as the respective spring seat body on the rigid axle at a distance from the spring seat body. This embodiment is favorable for lightweight construction or weight reduction of the rigid axle. This is because the strut enables the wheel carriers and the rigid axle to be realized with the same or even improved mechanical strength, in particular bending as well as torsional strength, with reduced material thickness. For this purpose, the strut is preferably welded to the respective wheel carrier and an axial main carrier of the rigid axle.

BRIEF DESCRIPTION OF THE DRAWINGS

The terms Fig., Figs., Figure, and Figures are used interchangeably in the specification to refer to the corresponding figures in the drawings.

In the following, the invention is explained in more detail with reference to a drawing illustrating several embodiments.

Figure 5B:
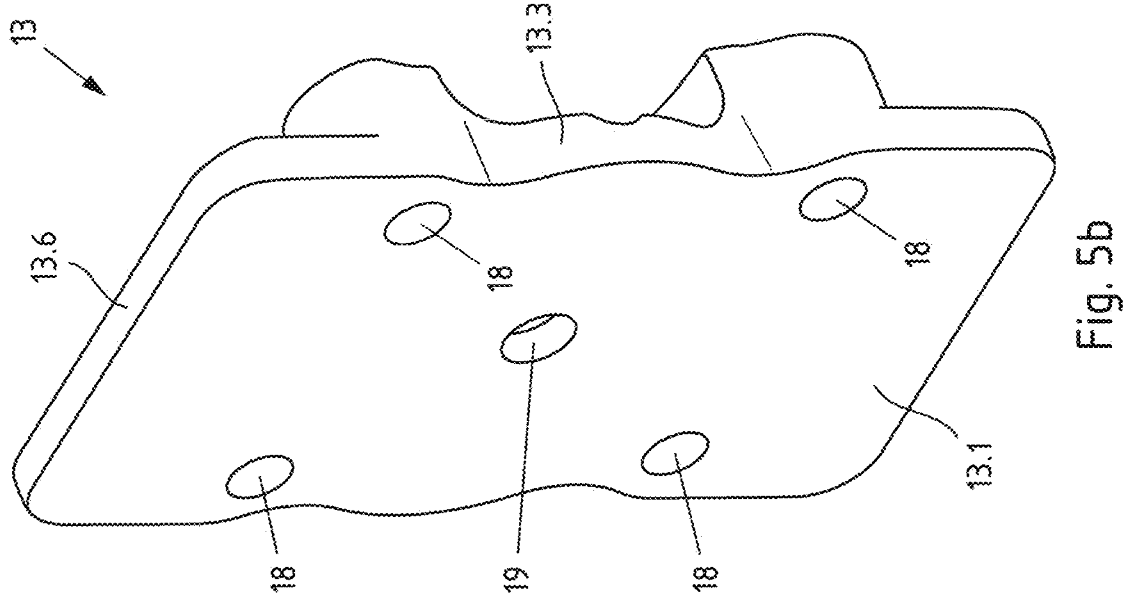
Figure 5A:
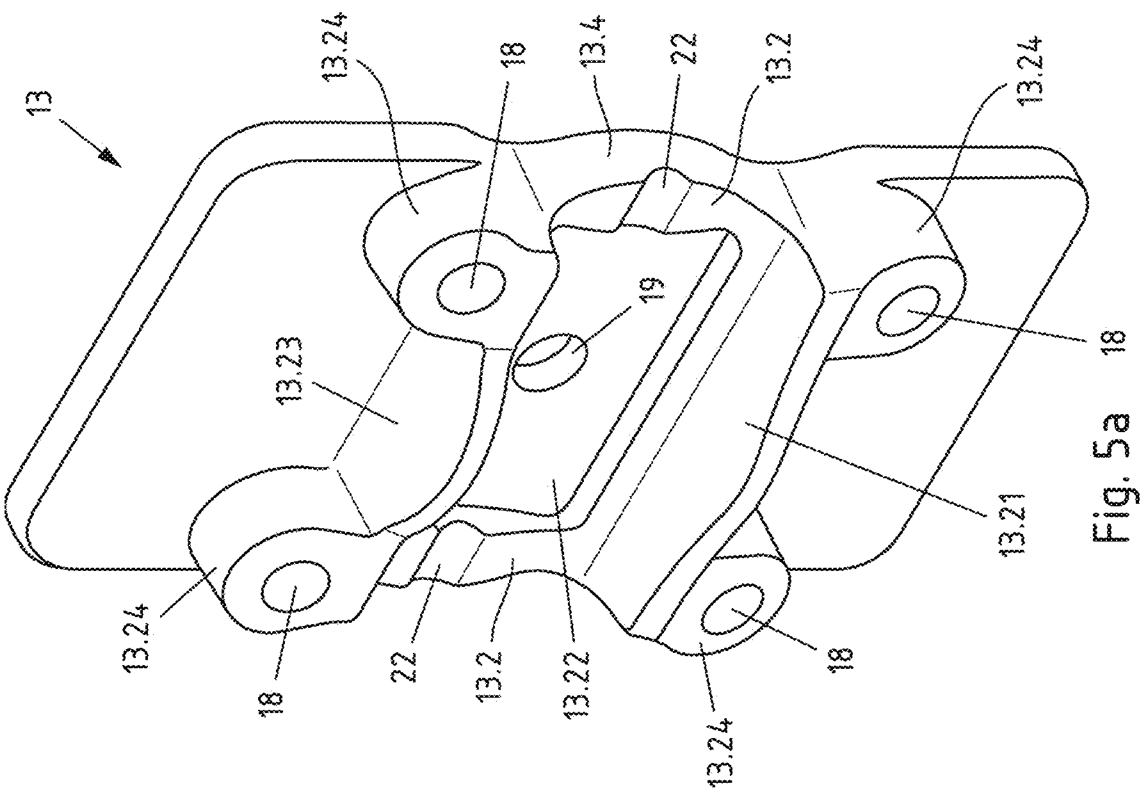
Figures 5C, 5D:
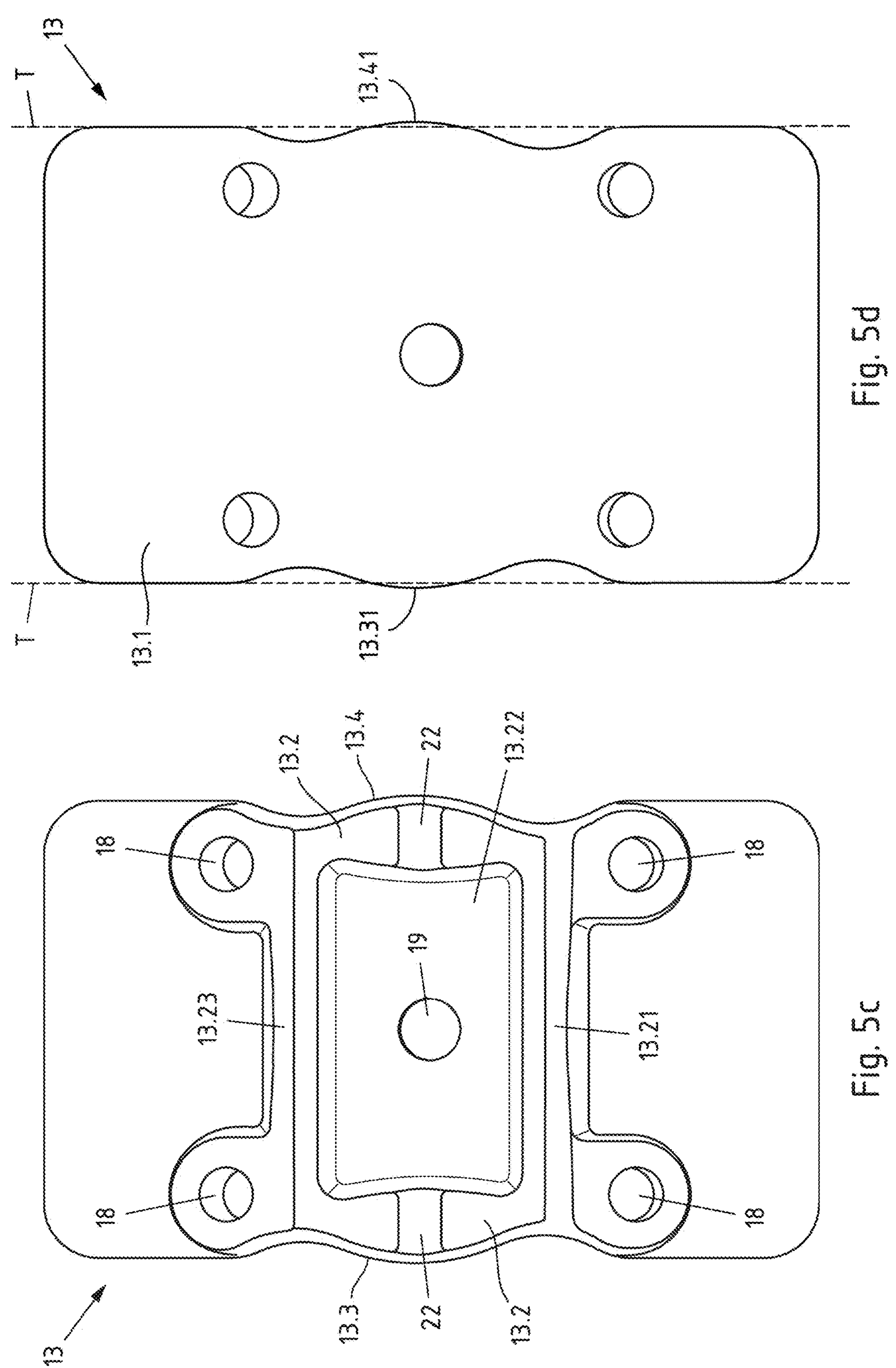

FIG. **5*a*** shows a spring seat body according to the invention in a perspective bottom view;

FIG. **5*b* shows the spring seat body shown in FIG. 5*a*** in a further perspective view;

FIG. **5*c* shows the spring seat body shown in FIG. 5*a* in bottom view; and FIG. 5*d* shows the spring seat body shown in FIG. 5*a*** in top view.

DESCRIPTION OF THE INVENTION

The rigid axle 1 according to the invention shown in the drawing is intended for a motor vehicle, in particular a utility vehicle, for example a van, minibus or small transporter. The rigid axle 1 is preferably designed as a non-driven rigid axle. It has a flattened or substantially flat upper surface 3.1, which serves as a connecting surface. The rigid axle 1 is made, for example, from a tube 3 which has a closed, essentially rectangular or square hollow profile with rounded edges. The tube 3 may also be referred to as an axle tube or axial main beam. It is preferably made of steel.

Wheel carriers 4, 4' are arranged at the ends of the rigid axle 1 and are connected to the tube (axial main carrier) 3 by weld seams. The wheel carriers 4, 4' can be designed as a metal casting or forged steel part. They each have a connecting section 4.1 which projects beyond the outer surfaces of the main beam 3. The respective end of the main beam 3 and the wheel carrier 4 or 4' attached thereto define a circumferential fillet. Accordingly, the weld seam 5 there is designed as a fillet weld, for example as a circumferential fillet weld.

Adjacent to the connecting section 4.1 of the wheel carrier 4, 4' welded to the main beam 3 is a fastening section 4.2 which projects upwards relative to the upper side 3.1 of the main beam 3. A wheel bearing (not shown) having a wheel hub or axle journal can be detachably mounted on the fastening section 4.2. For this purpose, the fastening section 4.2 has several threaded holes and/or through holes 6 for receiving fastening screws (not shown). The connecting section 4.1 and the fastening section 4.2 are formed together as a one-piece component.

The wheel carrier 4 or its fastening section 4.2 is supported on the rigid axle 1 by means of a strut 7. The strut 7 is, for example, in the form of a substantially triangular hollow body strut. The hollow-body strut 7 is preferably made of a sheet-metal molding. It has a back 7.1 which connects two legs 7.2 extending parallel to one another, each of which has two edges 7.21, 7.22 extending at right angles to one another. The lower edge 7.21 is materially connected, preferably welded, to the upper side 3.1 of the main beam 3, while the other or vertically extending edge 7.22 is materially connected, preferably welded, to the fastening section 4.2 of the wheel carrier 4. Furthermore, the lower end of the back 7.1 of the strut is materially connected, preferably welded, to the upper side 3.1 of the main beam 3. The upper end of the back 7.1 ends at a distance from the fastening section 4.2 of the wheel carrier 4. The edges 7.21, 7.22 of the respective leg 7.2, which extend at right angles to one another, are provided with a recess (free cut) 8 which faces the fillet defined by the main beam 3 and wheel carrier 4. Furthermore, a recess (free cut) 9 is formed on the lower edge 7.21 of the respective leg 7.2 in the area of the lower end of the back 7.1. This recess 9 allows the lower section 7.11 of the back 7.1—as clearly shown in FIG. 2—to be arcuate and to merge into a lower edge section 7.12, which is preferably substantially perpendicular to the upper side 3.1 of the main beam 3. The weld seams 10, 11 and 12 are designed as fillet welds.

A spring seat body 13 is arranged on the main beam 3 of the rigid axle 1 immediately adjacent to the respective wheel carrier 4, 4' or strut 7, which serves to connect at least one leaf spring (not shown). The spring seat body (leaf spring seat body) 13 is arranged on the same side as the strut 7, namely on the upper side 3.1 of the main beam 3 at a distance from the strut 7.

Figure 1:
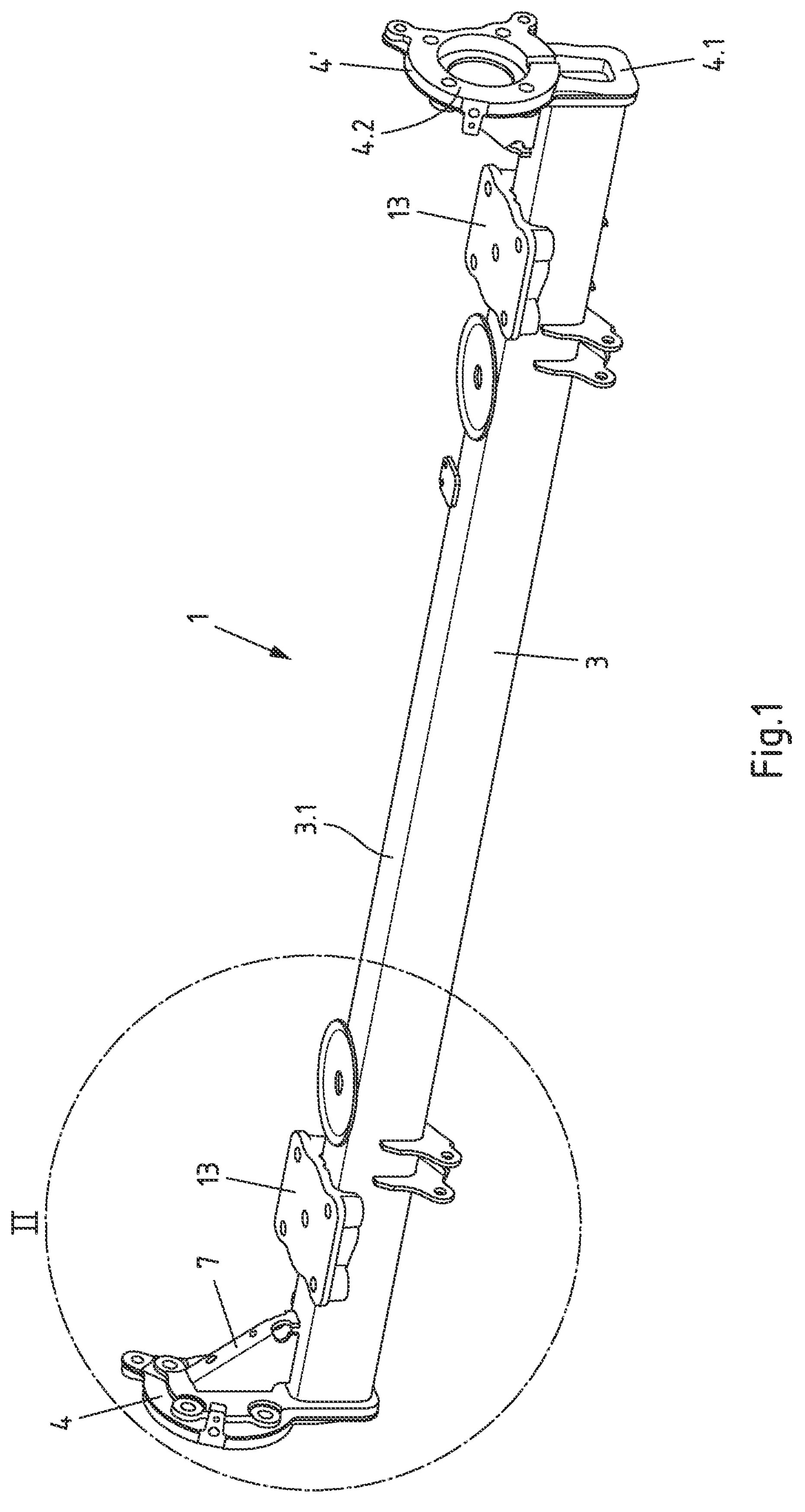
FIG. 1 shows a rigid axle according to the invention for a motor vehicle, in particular a utility vehicle, with spring seat bodies attached thereto, in a perspective view.

Furthermore, the rigid axle 1 is provided with fork-shaped mounts 14 for articulated mounting of the lower end of shock absorbers (not shown) and optionally with plate-shaped spring mounts (spring plates) 15 for mounting auxiliary springs (not shown), for example air springs or coil springs. The spring plates 15 are also arranged on the upper side 3.1 of the main beam 3. The respective spring plate 15 is spaced significantly further from the wheel carrier 4, 4' than the nearest spring seat body 13 (cf. FIG. 1). The fork-shaped mounts 14 for articulated mounting of the shock absorbers are welded to the underside 3.2 and the rear side 3.3 of the main beam 3. Viewed along the longitudinal center axis of the main beam 3, they are positioned between the spring seat body 13 and the spring plate 15 (see FIGS. 1 to 4).

Figure 3:
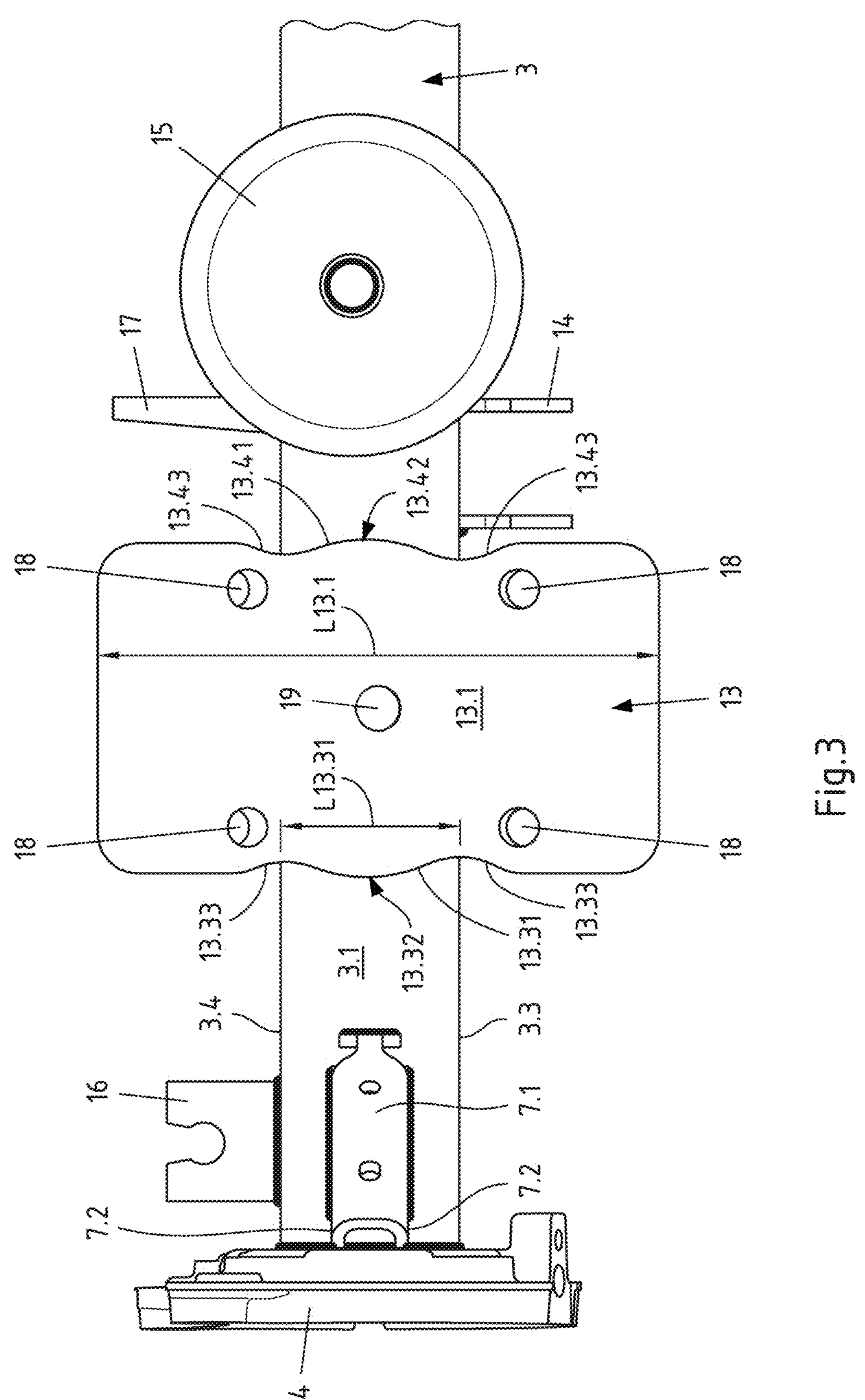
FIG. 3 shows a plan view of the section of the rigid axle shown in FIG. 2.

In addition, brackets 16, 17 for attaching brake system elements (not shown) or other chassis components (not shown) may be attached to the main beam 3 of the rigid axle (cf. FIG. 3).

The spring seat body 13 has an upper spring seat surface 13.1, a lower seat surface 13.2 and lateral edge surfaces 13.3, 13.4, 13.5, 13.6 which lie between the spring seat surface 13.1 and the seat surface 13.2. Furthermore, the spring seat body 13 is provided with holding means for holding tensioning means (not shown) for fastening at least one leaf spring to the spring seat body 13. The holding means are in the form of four through-holes 18, which serve in pairs to receive clamping brackets (not shown). The ends of the respective clamping bracket are in the form of threaded rods onto which nuts are screwed. A further through-hole 19 is preferably formed between the through-holes 18 receiving the clamping brackets. This through hole 19, which is arranged, for example, centrally on the longitudinal center axis of the spring seating surface 13.1, can serve to align the at least one leaf spring or a leaf spring support.

The seating surface 13.2 of the spring seat body 13 is defined by underside projections 13.21, 13.23 which, in the manner of a frame, delimit a depression or recess 13.22 on the underside of the spring seat body 13. The underside projections further comprise web-shaped projections 13.23 connecting dome-shaped or bushing-shaped projections 13.24. Through-holes 18 are formed in the projections 13.24 to receive the clamping means (clamping brackets). The sides of the web-shaped projections 13.23 facing each other rest against the parallel outer sides 3.3, 3.4 of the main beam 3 of the rigid axle 1 when the spring seat body 13 is in the mounted state.

The lateral edge surfaces of the spring seat body 13 comprise a first lateral edge surface 13.3 and a second lateral edge surface 13.4, which face away from each other and extend transversely to the rigid axle 1 in the mounted state of the spring seat body 13 on the rigid axle 1. The first lateral edge surface 13.3 is closer to the end of the rigid axle carrying a vehicle wheel than the second lateral edge surface 13.4 when the spring seat body 13 is mounted to the main beam 3 of the rigid axle 1 (cf. FIG. 3).

The first edge surface 13.3 has an edge section 13.31 which, in the fastened state of the spring seat body 13, lies in overlap with the rigid axle 1. As shown in particular in FIG. 3, this edge section 13.31—viewed from above—is formed as an outwardly projecting, preferably convex edge section, the apex or vertex 13.32 of which lies in a region of the first edge surface 13.3 which runs along a central length range L13.31 of the upper spring seat surface 13.1 running transversely to the main beam 3 of the rigid axle 1. This length range L13.31 marked by a double arrow in FIG. 3 is, for example, less than one third, preferably less than one quarter, particularly preferably less than one fifth of the length L13.1 of the upper spring seat surface 13.1 also marked by a double arrow.

The second lateral edge surface 13.4 of the spring seat body 13 has an edge section 13.41 which is preferably formed in accordance with the edge section 13.31 of the first lateral edge surface 13.3. As shown in FIG. 3, the edge section 13.41—viewed from above—is formed as an outwardly projecting, preferably convex edge section, the apex or vertex 13.42 of which lies in a region of the second edge surface 13.4. As shown in FIG. 3, the edge sections 13.31, 13.41 of the first edge surface 13.3 and of the second edge surface 13.4 can be formed axially symmetrically (mirror-symmetrically) with respect to one another. In particular, the spring seat surface with the through openings can be designed to be axisymmetrical.

The first edge surface 13.3 and the second edge surface 13.4 of the spring seat body 13 each have a fillet-shaped, preferably concave edge section 13.33, 13.43 along their sections that do not overlap with the main beam 3 of the rigid axle 1 as viewed from above. Furthermore, it can be seen in FIGS. 3 and 5*d* that the outwardly projecting, preferably convex edge section 13.31, 13.41 of the lateral edge surface 13.3 or 13.4 does not project or projects only slightly, for example less than 10 mm, beyond a tangent T which touches the sections of the first edge surface 13.3 or second edge surface 13.4 that are not lying in overlap with the rigid axle 1.

At least in the region at which the respective spring seat body 13 is connected to the main beam 3 of the rigid axle 1, the latter has a cross-sectional profile which preferably comprises two mutually parallel outer sides 3.3, 3.4, particularly preferably two pairs of mutually parallel outer sides 3.1, 3.2 and 3.3, 3.4.

The spring seat bodies 13 are carried-out as forged parts, preferably as forged steel parts. They are materially connected to the main beam 3 of the rigid axle. The material connection can be realized, for example, as an adhesive connection. Preferably, however, this material connection is implemented as a welded connection.

Figure 2:
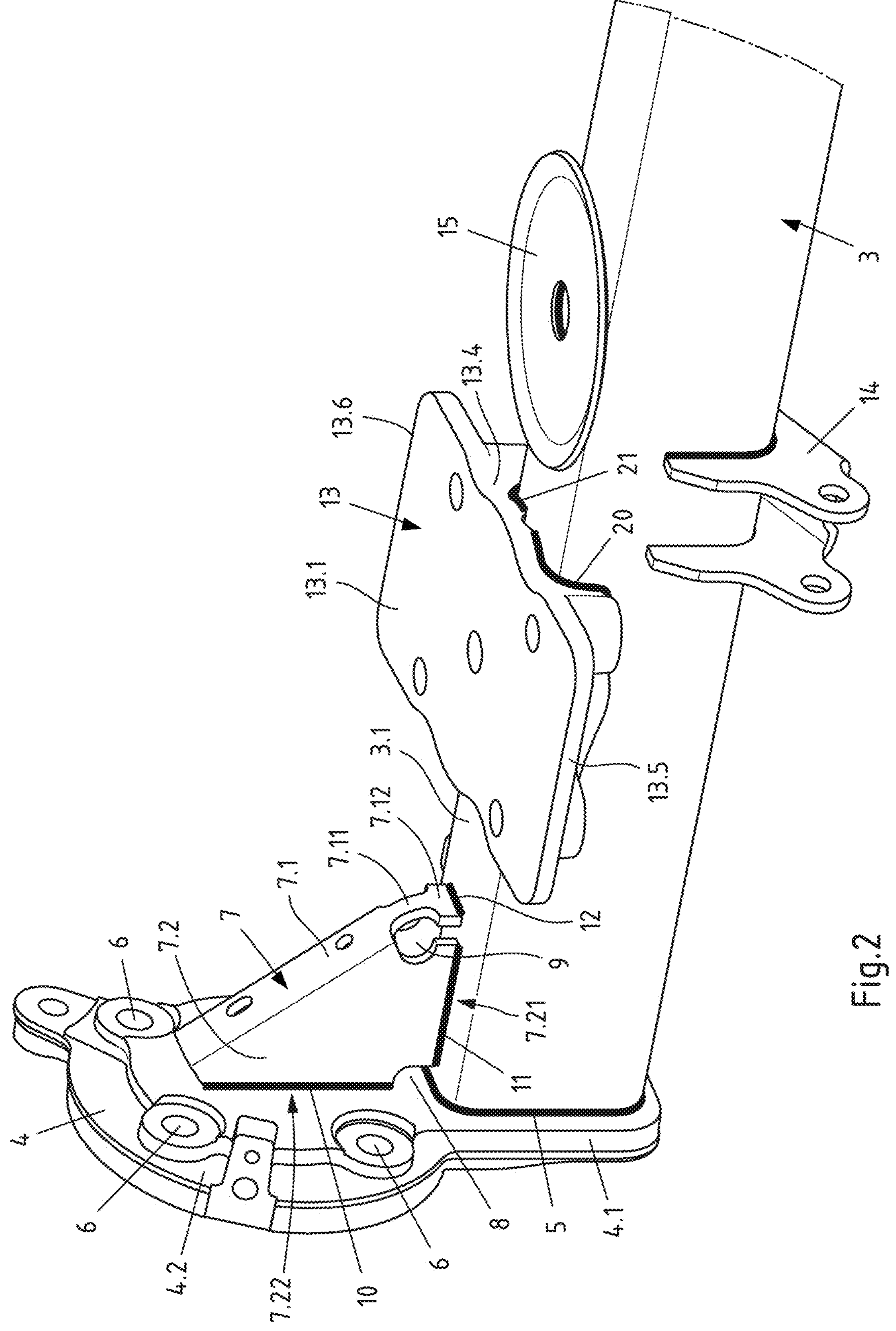
FIG. 2 shows an enlarged view of a section (details II) of the rigid axle shown in FIG. 1.
Figure 4:
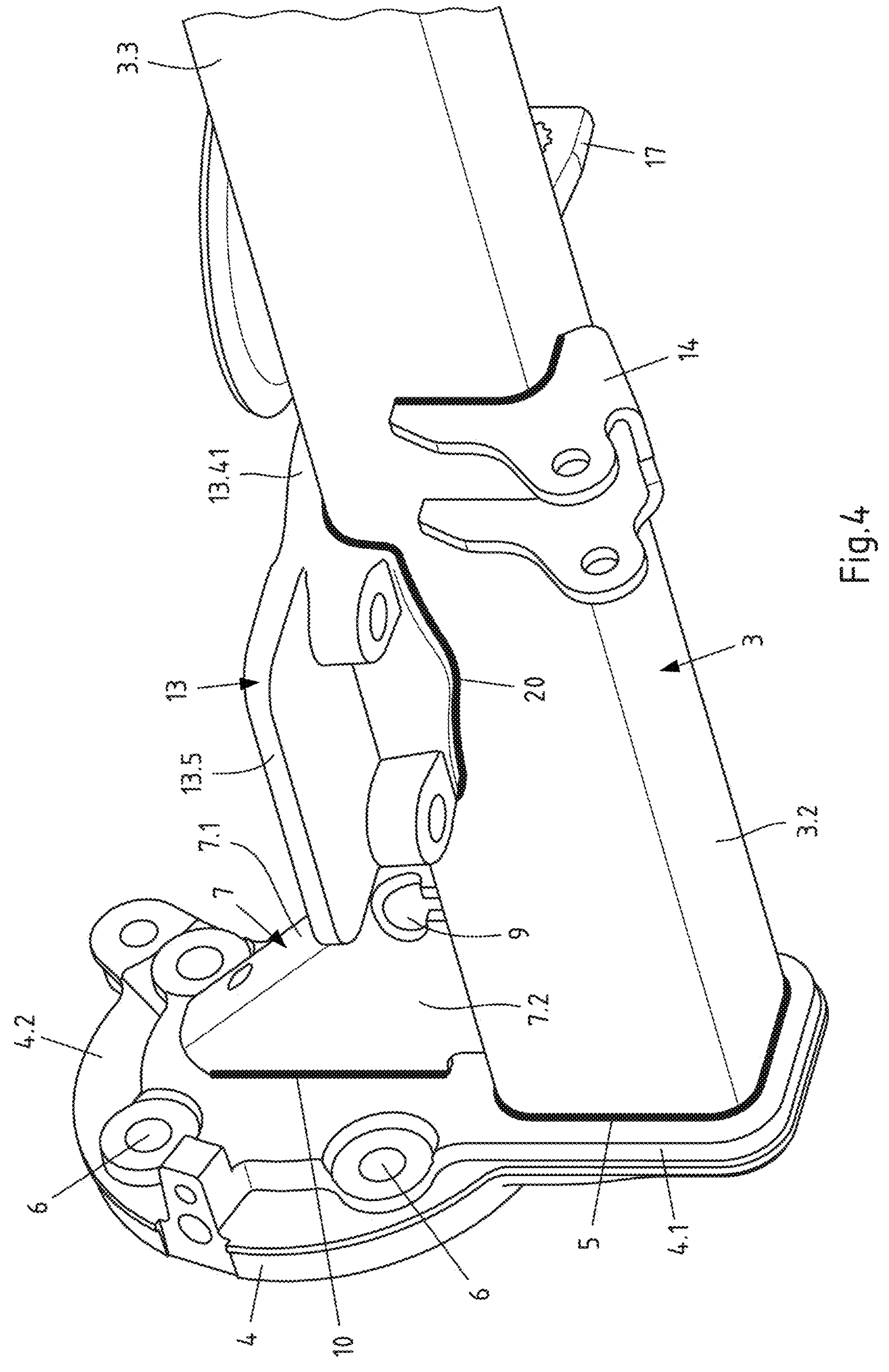
FIG. 4 shows the section of the rigid axle shown in FIG. 2 in a perspective view from below.

According to FIGS. 2 and 4, the spring seat body 13 is welded to the main beam 3 of the rigid axle 1 in that one or more weld seams 20, 21 are formed at least partially along the outwardly projecting, preferably convex edge section

13.31 of the first edge surface 13.3 and at least partially along the outwardly projecting, preferably convex edge section 13.41 of the second edge surface 13.4. The weld seams 20, 21 are implemented as fillet welds.

In FIGS. 2 and 5*a* to 5*c* it can be seen that recesses 22 are formed in the seating surface 13.2 of the spring seat body 13, which open at the edge section 13.31 of the first edge surface 13.3 and at the edge section 13.41 of the second edge surface 13.4. Preferably, the recesses 22 open substantially centrally at the respective edge section 13.31, 13.41 of the first edge surface 13.3 and second edge surface 13.4, respectively. The recesses 22 are formed in the shape of a groove, preferably a groove with an arcuate cross-sectional profile. The weld seams (fillet welds) 20, 21 are interrupted at the recesses 22, i.e. separated from each other.

The implementation of the invention is not limited to the embodiments shown in the drawing. Rather, numerous embodiments are conceivable which make use of the invention as described herein or in one of the subclaims even if the design deviates from the examples shown. For example, it is also within the scope of the invention to design the rigid axle 1 according to the invention as a drive axle, in which case the rigid axle is preferably formed from an axle housing.

The invention claimed is:

1. A spring seat body, comprising:

an upper spring seat surface, a lower seat surface, lateral edge surfaces located between the upper spring seat surface and the lower seat surface, and at least one pair of through holes for receiving and holding at least one clamping bracket for fastening at least one spring to the spring seat body, wherein the lateral edge surfaces comprise a first edge surface and a second edge surface, wherein the first edge surface faces away from the second edge surface, wherein the first edge surface and the second edge surface extend transversely to a rigid axle when the spring seat body is mounted on the rigid axle, wherein the first edge surface is closer to an end of the rigid axle carrying a vehicle wheel than the second edge surface, when the spring seat body is mounted on the rigid axle, wherein the first edge surface comprises an edge section which, in the mounted state of the spring seat body on the rigid axle, overlaps with the rigid axle, wherein the edge section, when viewed from above, is formed as an outwardly projecting convex edge section, an apex or vertex of which lies in a region of the first edge surface which runs along a central length range of the upper spring seat surface extending transversely to the rigid axle, wherein the central length range is less than one third of the length of the upper spring seat surface, wherein at least one recess is formed in the lower seating surface, and wherein the at least one recess opens out at the edge section of the first edge surface.

2. The spring seat body according to claim 1, wherein the second edge surface comprises a second edge section which, in the mounted state of the spring seat body on the rigid axle, overlaps with the rigid axle, wherein the second edge section, when viewed from above, is at least partially formed as an outwardly projecting convex edge section, the apex or vertex of which lies in a region of the first edge surface which runs along the central length range of the upper spring seat surface extending transversely to the rigid axle.

3. The spring seat body according to claim 1, wherein the spring seat body is manufactured as a forged steel part.

4. The spring seat body according to claim 1, wherein each of the first edge surface and/or the second edge surface comprise a fillet-shaped, concave edge section along sections that extend beyond the rigid axle when viewed from above.

5. The spring seat body according to claim 1, wherein the outwardly projecting convex edge section does not project beyond a tangent which touches the sections of the first edge surface or the second edge surface which do not overlap with the rigid axle.

6. The spring seat body according to claim 1, wherein at least one recess opens out centrally at said edge section of the first edge surface.

7. The spring seat body according to claim 1, wherein the spring seat surface and the at least one pair of through holes are designed to receive and hold the at least one clamping bracket for fastening at least one leaf spring.

8. A rigid axle for a motor vehicle, comprising at least one spring seat body according to claim 1.

9. The rigid axle according to claim 8, wherein the spring seat body is welded to the rigid axle.

10. The rigid axle according to claim 8, wherein the rigid axle has a flattened connecting surface or outer side at which the spring seat body is connected to the rigid axle.

11. The rigid axle according to claim 8, wherein the rigid axle comprises, in a region where the spring seat body is connected to the rigid axle, a cross-sectional profile comprising at least two mutually parallel outer sides.

12. The rigid axle according to claim 8, wherein the spring seat body is welded to the rigid axle by forming one or more weld seams at least partially along the outwardly projecting convex edge section of the first edge surface and/or at least partially along the outwardly projecting convex edge section of the second edge surface.

13. The rigid axle according to claim 8, wherein the rigid axle is a non-driven rigid axle, and wherein the rigid axle is formed from an axle tube.

14. The rigid axle according to claim 8, wherein the rigid axle comprises a first end and a second end, wherein a first wheel carrier is attached to the first end of the rigid axle, wherein a second wheel carrier is attached to the second end of the rigid axle, wherein each of the first wheel carrier and the second wheel carrier are supported on the rigid axle by a strut, and wherein the strut is arranged on the same side as the respective spring seat body on the rigid axle at a distance from the spring seat body.

15. The rigid axle according to claim 14, wherein the strut is welded to a respective wheel carrier and a main beam of the rigid axle.

* * * * *